United States Patent [19]
Richardson

[11] Patent Number: 5,820,270
[45] Date of Patent: Oct. 13, 1998

[54] SLEWING TURNTABLE BEARING

[75] Inventor: Edward James Richardson, Toronto, Canada

[73] Assignee: Totall Attachments Inc., Oakville, Canada

[21] Appl. No.: 863,041

[22] Filed: May 23, 1997

[51] Int. Cl.⁶ .................................................. F16C 33/04
[52] U.S. Cl. ........................ 384/275; 384/296; 384/297; 384/428
[58] Field of Search ..................................... 384/275, 296, 384/297, 428, 441, 421

[56] References Cited

U.S. PATENT DOCUMENTS 3,692,375  9/1972  Matt et al. ............................... 384/298
3,720,261  3/1973  Heilhecker et al. ..................... 384/420
5,549,394  8/1996  Nowak et al. ........................... 384/275

Primary Examiner—Lenard A. Footland
Attorney, Agent, or Firm—Anthony Asquith & Co.

[57] ABSTRACT

The rotatable fork-plate of a fork lift truck is mounted to a large-diameter slewing gear, and the slewing bearing fits inside. In place of the usual ball bearing, a plastic strip is curved around into a circle, and placed between the slewing gear and the stator frame. The circle is not complete, in that a circumferential gap is left between the ends. The rotor and stator are formed with suitable faces for supporting journal forces, and thrust forces both ways, via the plastic strip. The preferred profile of the strip is channel-shaped. The strip floats circumferentially between the rotor and the stator. The plastic strip being corrosion free, no seals are provided on the bearing, even for operation near sea-water.

12 Claims, 4 Drawing Sheets

SLEWING TURNTABLE BEARING

This invention relates to bearings, being bearings particularly of the kind known as turntable bearings, or slewing bearings, which find application e.g. in fork-lift-trucks, cranes, and the like. Such bearings are used with the rotation axis vertical or horizontal, as required.

BACKGROUND TO THE INVENTION

Slewing bearings have the following general characteristics:
  the speed of rotation of the bearing is slow, and intermittent, so the bearing generally does not get hot;
  the diameter of the bearing is large;
  the loading of the bearing is a mixture of journal and thrust loading, and is often accompanied by tipping and tilting forces, wherein the thrust loading is positive on the left and negative on the right of the bearing;
  the bearing is almost impossible to seal effectively, and is likely to be treated neglectfully as to lubrication and maintenance;
  the loading of the bearing is very variable as to magnitude, and the loadings are likely to include shocks, rapid reversals, and abusive episodes, as much as straight journal and thrust forces.

Traditionally, slewing bearings have been based on the usual forms of rolling-element anti-friction facilitation, namely ball bearings, needle bearings, etc. With slewing bearings, in most cases, bearing load capacity is not the problem, the bearing being so large; the problem facing the designer has been to ensure that the rolling components of the bearings are protected effectively enough to allow those components to have a good service life.

The invention is aimed at providing a slewing turntable bearing, in which the resistance of the bearing to the traditional problems of corrosion and early failure is enhanced. In the invention, a plastic rubbing or sliding element is substituted in place of the conventional rolling elements.

Of course, it has been possible to design conventional slewing turntable bearings to have a long service life; the point is that the cost of engineering a long service life has been very expensive. An aim of the invention is to make it possible to achieve a much improved length of service life, without compromising the other aspects of bearing performance, and at a fraction of the cost.

THE INVENTION IN RELATION TO THE PRIOR ART

Traditionally, the problems associated with sealing and protecting the rolling elements of large turntable bearings have not been solved. This has meant that these costly bearings all too quickly become contaminated due to water ingress, and the consequent corrosion leads to early failure. And apart from the practical difficulty of sealing the bearings, it is often the case that operators tend not to regard servicing and protecting the bearing as of high priority, perhaps because the duty seems so light for such a large bearing. As mentioned, the problem with turntable bearings is not so much over-loading or too high a speed, but contamination, and consequent premature corrosion and seizing.

It should be noted that the bearing as described herein is unsuitable for use in a case where the bearing duty includes high speed, or constant loading, because the friction of plastic-on-steel, even when greased, cannot be relied upon to be vanishingly small, as it can in the case of a rolling-element bearing. The benefit of the described bearing is not that the friction is vanishingly small, but rather that the friction does not increase due to exposure to the elements.

It is recognised that the benefits of the design of bearing as described herein are applicable to the slewing ring situation, but not necessarily to other bearing situations.

GENERAL FEATURES OF THE INVENTION

In a slewing turntable bearing, in place of the usual ball bearing, a plastic strip is curved around into a circle, and is placed between the rotor and the stator of the bearing. The circle is not complete, in that a circumferential gap is left between the ends of the plastic strip. The rotor and stator members are formed with suitable faces and surfaces for supporting journal forces, and thrust forces both ways, via the plastic strip, i.e. whereby the rotor and stator do not touch, metal to metal.

The preferred profile of the strip is channel-shaped. Preferably, the strip floats circumferentially between the rotor and the stator. The plastic strip being unaffected by corrosion, no seals need be provided on the bearing, even for operation near sea-water.

Besides the channel-shaped profile, various other configurations of the profile of the strip, and the corresponding profiles of the rotor and stator members are contemplated, and are described.

DETAILED DESCRIPTION OF PREFERRED EMBODIMENTS

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
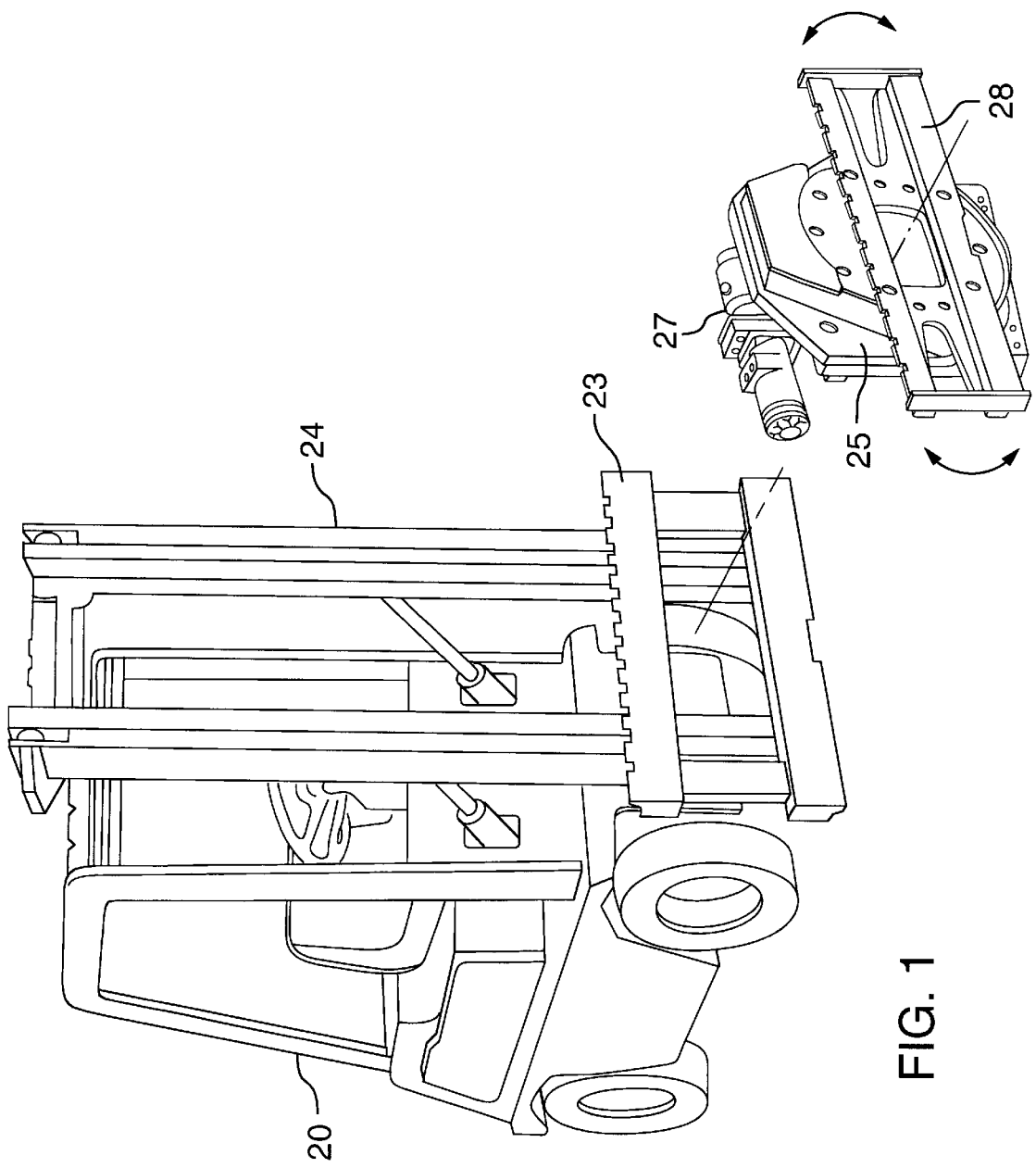
FIG. 1 is a pictorial view of a fork-lift-truck, to which is attached a swivel bearing unit that embodies the invention.

FIG. 1 shows a fork-lift-truck 20, having a carriage 23 which is raisable on a mast 24. A backplate 25 is adapted to be fixed onto the carriage 23. A turntable 26 is arranged to rotate in the manner as shown, the rotation being powered by a hydraulic motor and gearbox 27. Various (conventional) kinds of attachments, clamps, etc., can be bolted to the turntable 26, which are suitable, as required, for picking up a load, and for turning the load over. As shown, a fork-plate 28 is carried by the turntable 26. Forks attached thereto are used for engaging with appropriate pockets on pallets, to enable the pallets to be picked up and turned over.

Figure 2:
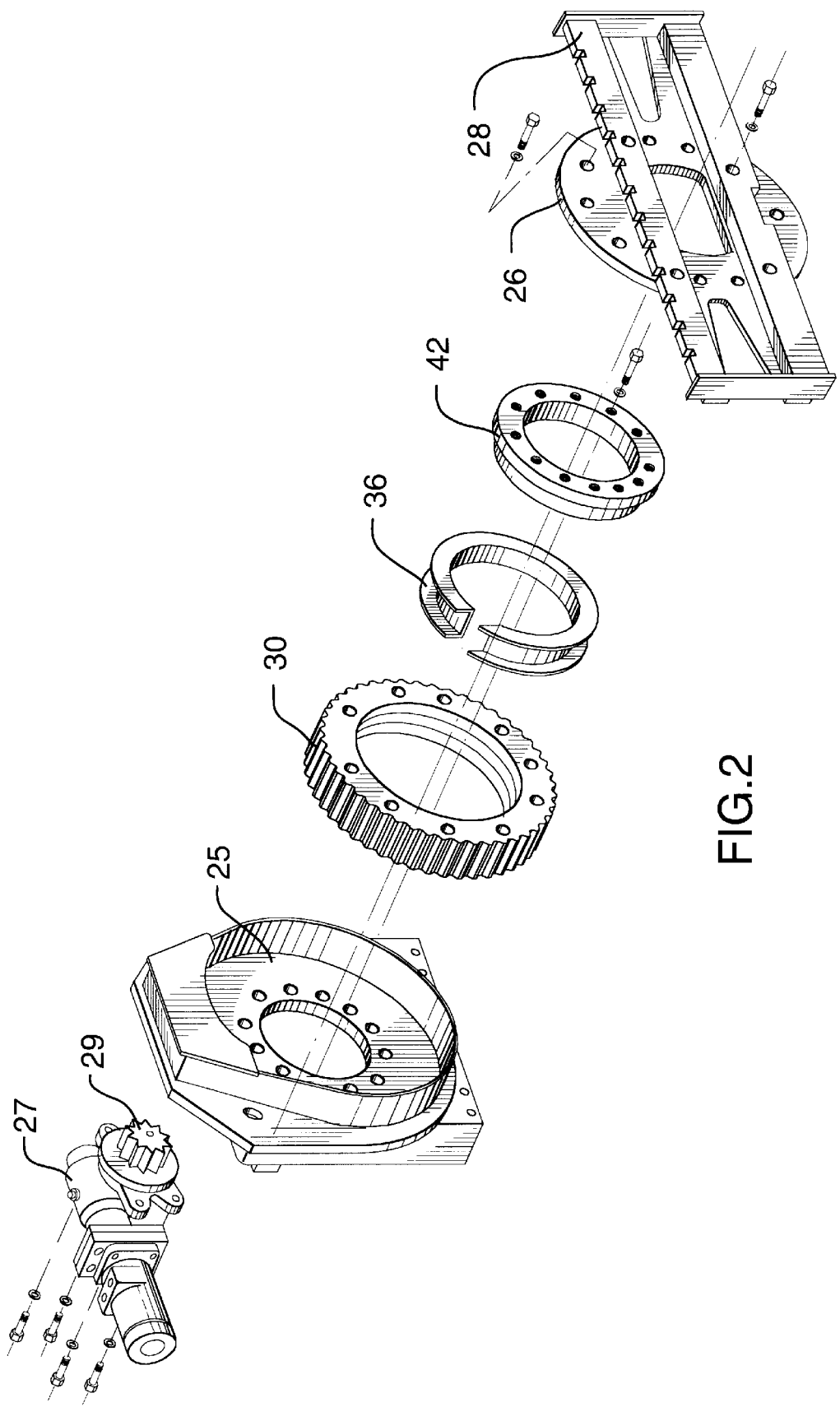
FIG. 2 is a corresponding view to FIG. 1, showing some of the components of the bearing unit.

The components of the unit 26 are shown in FIG. 2. The output shaft of the motor/gearbox 27 carries a pinion 29, which is in mesh with a slewing gear 30. The slewing gear 30 is bolted to the turntable 26.

Figures 3, 3A:
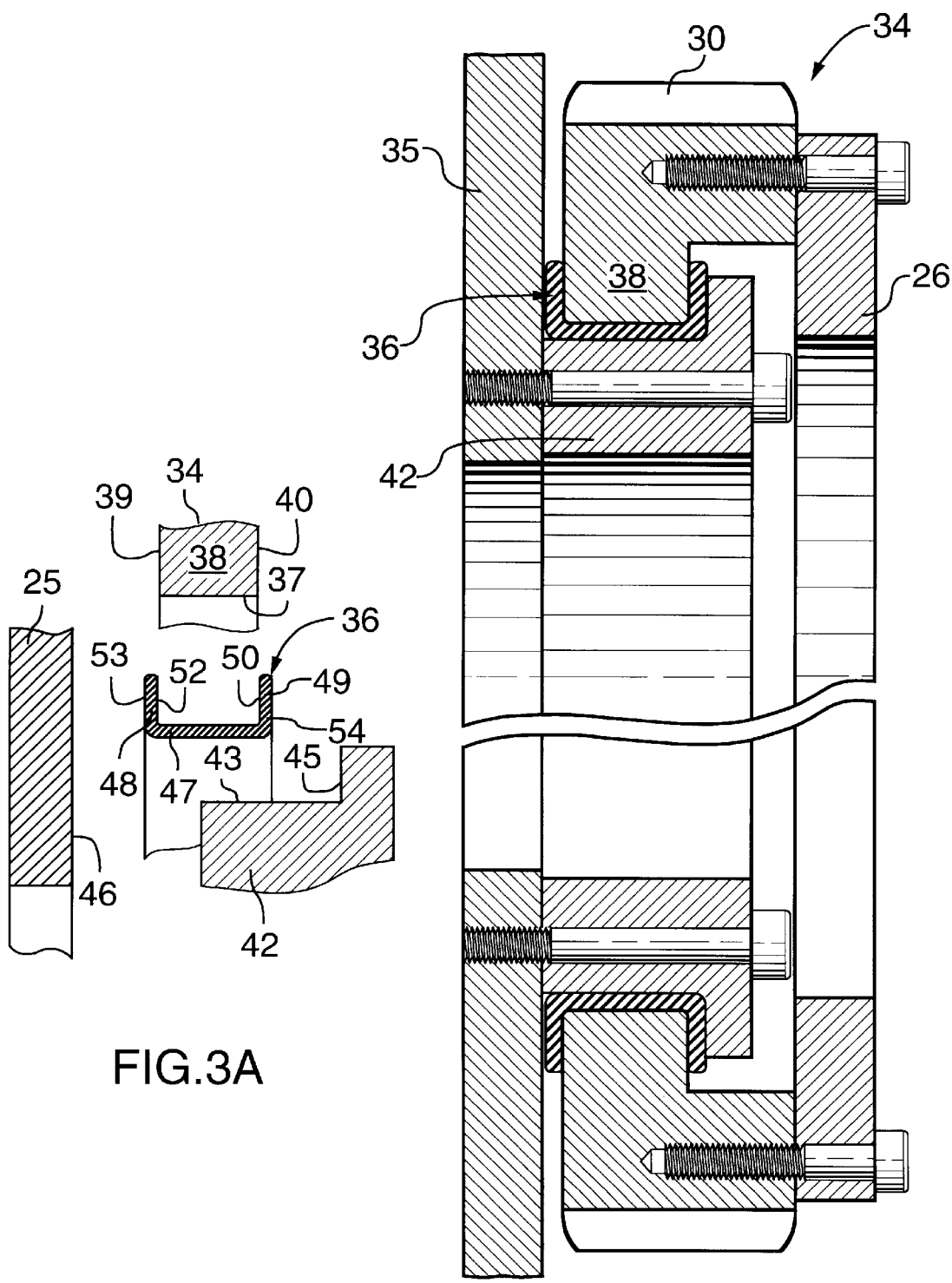
FIG. 3 is a cross-sectioned side elevation of the bearing unit.
FIG. 3a is a close-up of an area of FIG. 3.

The slewing gear 30 is guided for rotation with respect to the backplate 25 in a slewing bearing assembly 32 (FIG. 3). The bearing assembly 32 comprises a rotor-member 34, a stator-member 35, and a bearing element 36. The rotor-member 34 is provided with an inward-facing right-cylindrical surface 37 of a shaped flange 38 on the inside of the slewing gear 30, and left and right facing thrust faces 39,40. The stator-member 35 is in two bolted-together components, the backplate 25 and the spigot-ring 42. The stator-member includes an outward-facing right-cylindrical surface 43. Left and right thrust-faces 45,46 are provided in the stator-member.

Between the rotor and the stator lies the bearing element 36, which is made from a strip of plastic material, such as UHMW polyethylene, or high density urethane. The profile of the strip 36 is channel-shaped, comprising a floor 47, and left and right side-walls 48,49. The inside distance between the left- and right-facing inside-faces 50,52 of the side-walls 48,49, in the axial sense, is a little larger than the axial thickness across faces 39,40 of the flange 38.

Similarly, the axial distance overall outside the left- and right-facing outer-faces 53,54 of the side-walls of the strip is a little shorter than the axial distance between right-facing surface 46 of the backplate 25 and left-facing surface 45 of the spigot-ring 42. That is to say, the profile of the plastic strip 36 is a little smaller all round than the space in which the strip is fitted. The strip is loose with respect to both the rotor-member 34 and the stator-member 35.

Figure 4:
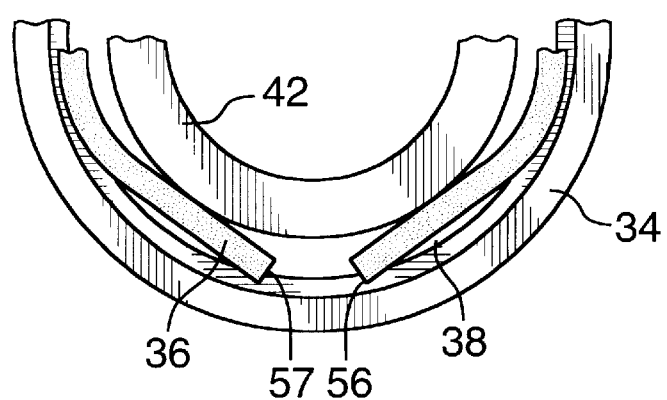
FIG. 4 is a pictorial view showing a stage of assembly of the bearing unit.

Because the plastic strip 36 is not a complete circle, assembly is quite simple. First, the strip is curved around, and inserted, from inside, into engagement with the flange 38 on the gear 30. By its natural stiffness, the strip tends to straighten itself out, the ends 56,57 lying as shown in FIG. 4. The spigot-ring 42 is then easily manipulated against the straight areas near the ends, forming them into the final fully curved shape. The spigot ring can then be inserted all the way inside the circle formed by the strip, and then the ring 42 can be bolted to the backplate 25.

It is noted that the plastic strip 36 is not attached to either the rotor or the stator, but is free to float circumferentially relative to either member. The strip is held in place entirely by virtue of its shape, and the shape of the surrounding faces and surfaces.

As will be understood, the strip 36 comprises a bearing element, in that journal forces, as well as thrust forces in both (axial) directions, between the rotor and stator members, are fully supported.

Figure 5:
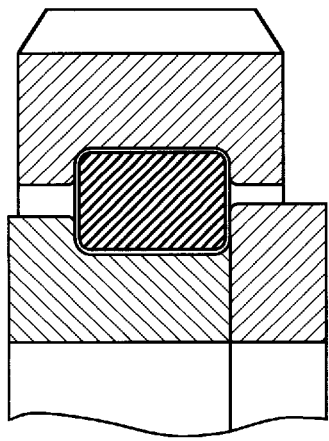
FIG. 5 is a sectioned side elevation corresponding to FIG. 3 of another bearing unit.
Figure 7:
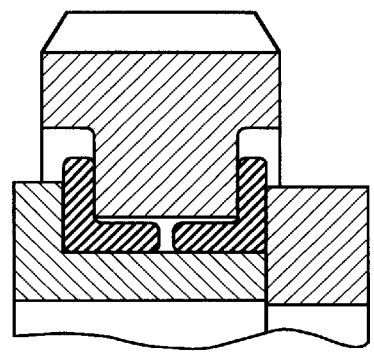
FIG. 7 is a sectioned side elevation corresponding to FIG. 3 of another bearing unit.
Figure 6:
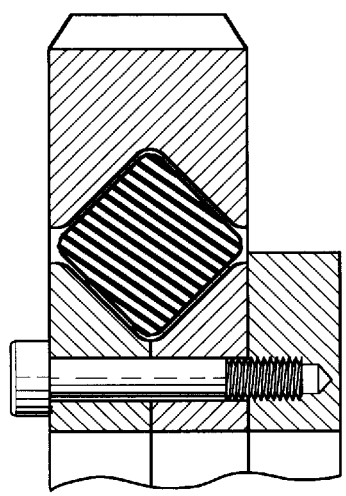
FIG. 6 is a sectioned side elevation corresponding to FIG. 3 of a further bearing unit.

Other shapes of profile of the plastic strip are contemplated, besides the channel-shaped profile that is shown in FIG. 3. FIGS. 5 and 6 show alternative profiles. FIG. 7 shows that the plastic strip can be in two components. In another alternative arrangement, the rotor can be the radially innermost of the rotor and the stator members.

The channel-shaped profile is preferred. It may be noted that the rubbing loading on the plastic strip is not so large that there is a danger of the plastic wearing away. Therefore, since it does not have to provide for wear, the plastic does not have to be thick. Thick plastic material might distort and deflect more under heavy loading, whereas the relatively thin material of the channel tends to hold its shape and form.

For proper support of loads, preferably the strip should not be hollow.

A large surface area is important in reducing specific bearing loads, and the channel-shaped profile has large surface areas in the journal mode, and in both thrust modes.

Also, the channel profile, though presenting large-area faces, is easy to bend into smooth curves without kinking (assuming it is bent with the floor of the channel to the inside).

The reasons why the plastic strip is acceptable and preferable in a slewing ring or turntable bearing will now be considered.

As in any bearing, of course the frictional drag on the slewing ring bearing should be small. But, in a slewing ring bearing, the friction need be by no means (virtually) zero; and yet the main aim of the designer of a traditional rolling-element type of bearing is to get the friction coefficient down to zero. In the slewing ring, the duty cycle is not demanding, comprising typically a quarter turn once or twice a minute. A slewing ring bearing, if it fails at all, fails by being subjected to a momentary overload; such bearings do not fail by wearing out in the sense that bearings on high-speed shafts, for example, wear out. Corrosion is the factor that changes this picture, in the conventional slewing ring designs. Once water enters the rolling bearing, early failure (due to seizing) quickly follows.

Typically, a slewing bearing has to be large in diameter (30 cm or more) because that is the size of the gear to which the slewing bearing is attached. Also, the slewing ring bearing is often subject to tipping and tilting; that is to say, the thrust loads on the left of the bearing act in the opposite sense to the thrust load on the right side of the bearing, and therefore a good spread across the diameter of the bearing is advantageous.

Rolling-element bearings in such large sizes are hugely expensive. Not only that, but the manufacturers thereof, in an attempt to keep costs down, offer only a limited range of sizes; and sometimes a designer of a slewing ring has had to compromise his design to accommodate a less than ideal size of rolling bearing. But with the plastic strip arrangement, there is no restriction to standard diameters, and the designer has great freedom to select ideal sizes.

As mentioned, friction does not have to be zero in a slewing ring bearing. Plastic bearing elements fare best in cases where the loads may be high, but where the rubbing speeds are small. High load capacity, ability to absorb shock loads and constant fluctuations in load and speed, are important, and if designed properly the plastic bearing is able to resist abusive loads without taking a permanent deflection, and can support these conditions without cracking or breaking under impact.

That there is a difference in cost between a plastic strip and a rolling element bearing needs no explanation. The difference in weight can also be significant.

But a key advantage of the plastic bearing strip is its ability to function under conditions that would quickly lead to corrosion if rolling-element bearings were used. In the processing of a catch of sea-fish, for example, the need arises to turn over a pallet of fish, dripping with sea water, and the slewing ring turntable bearing on the fork-lift truck cannot help but be doused in salt water. Replacing the slewing ring bearings on fork-lift-trucks every few weeks has been a significant cost to be added to the price of fish.

It has been observed that the (floating) plastic strip moves randomly between the rotor and stator. It might be expected that the strip, once it had stuck to one of either the stator or rotor, would then thereafter always stick to that same member. However, the strip has been observed to move randomly, i.e. first it sticks to the rotor, but then it sticks to the stator. This randomising of the motion of the strip between the rotor and the stator is advantageous in that the random motion serves to even out the rubbing over the strip, and thereby to promote a long life.

It is suggested that the explanation as to why the strip moves randomly is to do with the constant reversals of load, and frequent shock loading, to which the plastic is subjected. It is also suggested that the natural tendency of the strip to uncoil itself, and its tendency to have straight ends (FIG. 4), might also be of use in ensuring the strip does not stay all the time with one or other of the rotor or stator.

The plastic material should preferably be greased, and a grease receptacle is provided for that purpose in the stator. The large gap between the ends of the strip is significant in that the gap serves as a moving reservoir for the grease, which spreads the grease progressively over all the faces. Also, the gap serves to accommodate and collect the sometimes considerable amount of dirt that can collect in the bearing. It is noted that there is no protection whatever, in the assembly as described, by way of seals or other protection for the plastic strip, nor for the metal surfaces against which the plastic rubs.

In a case where sea water can get into the bearing, the surfaces against which the plastic rubs preferably should be made of stainless steel; a corroded and pitted surface on the metal might become so rough as to cause damage to the plastic.

The plastic strip is easy to install, as described. Also, the metal components into which the strip is to be installed are simple to machine, because there is no need for the tight-tolerance dimensions and finishes that are needed when accommodating rolling-element bearings. The plastic strip is very inexpensive, being simply a length cut off an extruded strip.

I claim:

1. Slewing turntable bearing assembly, wherein
    the assembly includes a rotor-member and a stator-member, which are disposed in rotor/stator configuration about an axis of rotation;
    the assembly includes a length or strip of plastic;
    the plastic strip is curled around into a circular configuration, which lies between the rotor-member and the stator-member;
    the profile of the plastic strip has a strip-first-thrust-face, being a face of the strip which faces in the first axial direction;
    the profile of the plastic strip has a strip-second-thrust-face, being a face of the strip which faces in the opposite axial direction;
    the profile of the plastic strip has a strip-inwards-journal-surface, being a surface of the strip which faces in the radially inwards direction;
    the profile of the plastic strip has a strip-outwards-journal-surface, being a surface of the strip which faces in the radially outwards direction;
    the rotor-member is formed with a rotor-first-thrust-face, a rotor-second-thrust-face, and a rotor-journal-surface;
    the stator-member is formed with a stator-first-thrust-face, a stator-second-thrust-face, and a stator-journal-surface;
    the plastic strip, the rotor-race, the stator-race, and the faces and surfaces thereon, are so dimensioned and arranged as to lie relatively in accordance with the following:
    the rotor-first-thrust-face lies in operative face-to-face abutment with the strip-first-thrust-face;
    the stator-first-thrust-face lies in operative face-to-face abutment with the strip-first-thrust-face;
    the rotor-second-thrust-face lies in operative face-to-face abutment with the strip-second-thrust-face;
    the stator-second-thrust-face lies in operative face-to-face abutment with the strip-second-thrust-face;
    the rotor-journal-surface lies in operative face-to-face abutment with one of either the strip-inwards-journal-surface or the strip-outwards-journal-surface;
    the stator-journal-surface lies in operative face-to-face abutment with the other of the strip-inwards-journal-surface or the strip-outwards-journal-surface;
    and the plastic strip is of such a length L, between its ends, that, in relation to the rotor-member and stator-member, when the strip lies curved around in the circular configuration therebetween, the strip is short of a complete circle, in that the ends of the strip lie separated by a substantial gap.

2. Assembly of claim 1, wherein the strip is free to float rotationally with respect to both the rotor-member and the stator-member.

3. Assembly of claim 1, wherein the profile of the plastic strip is the same all along the length of the strip.

4. Assembly of claim 1, wherein the journal-surfaces are right-cylindrical, and the thrust-faces are flat, and normal to the axis.

5. Assembly of claim 4, wherein:
    the profile of the strip is channel-shaped, having a floor and two side-walls;
    one of the rotor and stator members is so formed as to straddle outside the side-walls of the strip, and the cylindrical surface of that member abuts the side of floor remote from the side-walls;
    the other of the rotor and stator members is so formed that its left-and right-facing faces lie between and inside the side-walls of the strip, and the cylindrical surface of that member abuts the other side of the floor.

6. Assembly of claim 5, wherein the plastic strip is curved in the sense in which the floor lies inside, and the side walls lie outside.

7. Assembly of claim 1, wherein the rotor member is radially outside the stator member.

8. Assembly of claim 1, wherein the rotor member is integral with a slewing gear.

9. Assembly of claim 8, wherein the gear meshes with a pinion on a drive-shaft, and the assembly includes a motor means for turning the drive-shaft.

10. Assembly of claim 1, wherein the assembly is of such a large size that the circle into which the plastic strip is curved is of at least 30 cm diameter.

11. Assembly of claim 1, wherein the assembly includes a means in the stator-member for applying grease lubricant to the said faces and surfaces.

12. Assembly of claim 1, wherein the assembly is a slewing-ring turntable-bearing for the carriage of a fork-lift-truck.

* * * * *